(12) United States Patent
Renke et al.

(10) Patent No.: US 9,855,882 B2
(45) Date of Patent: Jan. 2, 2018

(54) FLUSH MOUNT INTERIOR TRIM TIE DOWN LOOP

(71) Applicant: GM Global Technology Operations LLC, Detroit, MI (US)

(72) Inventors: David T. Renke, Macomb, MI (US); Michael A. Faucett, Jr., Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/145,904

(22) Filed: May 4, 2016

(65) Prior Publication Data

US 2017/0320426 A1    Nov. 9, 2017

(51) Int. Cl.
*B60P 7/08*    (2006.01)

(52) U.S. Cl.
CPC .......... *B60P 7/0807* (2013.01); *B60P 7/0876* (2013.01)

(58) Field of Classification Search
CPC .............................. B60P 7/0807; B60P 7/0876

USPC ........ 410/101, 102, 106, 107, 109–113, 116; 24/265 CD, 115 K; 248/499

See application file for complete search history.

(56) References Cited

U.S. PATENT DOCUMENTS

| | | | | |
|---|---|---|---|---|
| 3,298,652 A * | 1/1967 | Burdick | ................ | B60P 7/0807 410/107 |
| 5,265,991 A * | 11/1993 | Herrick | ..................... | B60P 7/13 410/77 |
| 8,529,176 B2 * | 9/2013 | Jutila | ..................... | B60P 7/0807 410/106 |

* cited by examiner

*Primary Examiner* — Stephen Gordon
(74) *Attorney, Agent, or Firm* — Lorenz & Kopf, LLP

(57) ABSTRACT

A product may include a base that may have a first face and an opposite second face. An anchor may be connected to the first face. A pivot may be provided for the base so that the base may be turned on the pivot. The base may be moveable to a first position where the first face may face in a first direction where the first face may be revealed and the second face may be concealed. The base may be moveable to a second position where the second face may face in the first direction where the first face may be concealed and the second face may be revealed.

18 Claims, 5 Drawing Sheets

FLUSH MOUNT INTERIOR TRIM TIE DOWN LOOP

TECHNICAL FIELD

The field to which the disclosure generally relates includes retention, and in particular includes retention of objects in place relative to a surface.

BACKGROUND

Securing objects in place may involve the use of an anchoring device that may function as a tie-down appliance. A common anchoring device involves an anchor that is attached to a surface to which objects, such as cargo, are desirably retained.

SUMMARY OF ILLUSTRATIVE VARIATIONS

A number of illustrative variations may involve a product that may include a base that may have a first face and an opposite second face. An anchor may be connected to the first face. A pivot may be provided for the base so that the base may be turned on the pivot. The base may be moveable to a first position where the first face may face in a first direction where the first face may be revealed and the second face may be concealed. The base may be moveable to a second position where the second face may face in the first direction where the first face may be concealed and the second face may be revealed.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
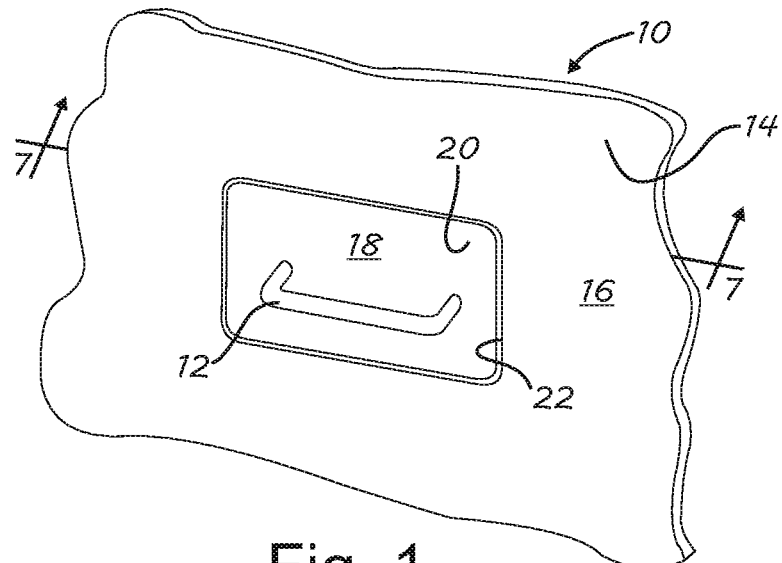
FIG. 1 is a fragmentary, perspective illustration of a product according to a number of variations.

According to a number of variations as illustrated in FIG. 1, a product 10 may include an anchor loop 12. The anchor loop 12 may be provided so as to be revealed on the side of a surface 14, where retention of objects relative to the surface 14 is desirable. The surface 14 may be on a panel 16 that may be flat or contoured. The panel 16 may be a deck panel, or a load floor, or a side panel, or a roof panel, or may be of another nature, and may be disposed in any orientation. The panel 16 may be a trim panel, or a structural panel, or any other structure on which an anchor loop is desirable. The panel 16 may be an exterior panel or an interior panel. For example, the panel may be an interior or exterior panel of a vehicle, or may be located in another environment. The anchor loop 12 may be used to secure articles in a position relative to the panel 16. In one example, the anchor loop 12 may be used as a tie down point to hold articles against shifting in relation to the panel 16. The articles may rest on the panel 16, on a neighboring panel, or on a supplemental device. In another example, a cargo net may be secured to the anchor loop 12 and may hold articles. The anchor loop 12 may be mounted to, or formed with, a base 18, which may be secured to the panel 16. The anchor loop 12 may be located on a first face 20 of the base 18. The base 18 may be located in an opening 22 in the panel 16.

Figure 2:
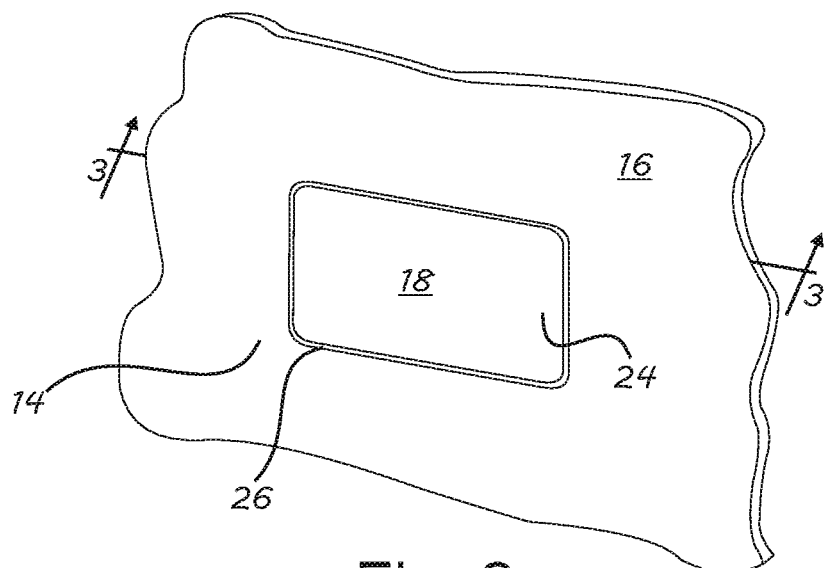
FIG. 2 is a fragmentary, perspective illustration of a product according to a number of variations.

The anchor loop 12 may project from the surface 14 in the position of FIG. 1. In other variations, the anchor loop 12 may be recessed in the panel 16, but may remain readily available for securing a line or clip thereto. The anchor loop 12 may pivot relative to the base 18, or may be fixed thereon. In either case, the distance the anchor loop projects from the surface 14 may be reduced. However, the surface 14 may have a discontinuity as a result of the existence of the anchor loop 12. In a number of variations the anchor loop 12 and the base 18 may be reversible. As shown in FIG. 2, they may be configured to flip around in the opening 22 to reveal a second face 24 of the base 18, which is on an opposite side of the base 18 from the first face 22. The second face 24 may be substantially flush with the surface 14 for reduced discontinuity. A clearance gap 26 between the base 18 and the panel 16 may be minimized so as to be only large enough to allow the base 18 to reverse. As a result, the product 10 may provide an anchor loop 12 that may be revealed in a convenient location when desired, and may be concealed when not needed. The concealed anchor loop 12 may improve appearance, or may provide a more continuous surface 14.

Figure 3:
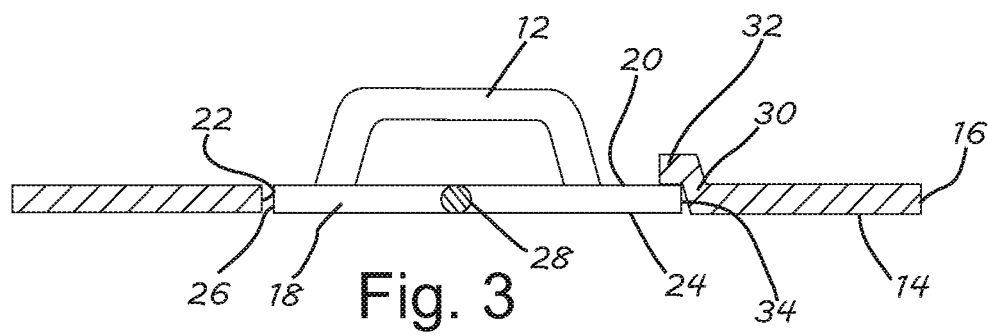
FIG. 3 is a schematic, cross sectional illustration of a product according to a number of variations, taken along the line 3-3 as indicated in FIG. 2.

With reference to FIG. 3, in a number of variations the anchor loop 12 may be positioned in a concealed state as in FIG. 2. The second face 24 of the base 18 and the surface 14 of the panel 16 may cooperate to provide a substantially continuous surface. The anchor loop 12 may be concealed behind the panel 16 and the base 18. The base 18 may be supported by a shaft 28, or shafts that may project from opposite edges of the base 12 and that may be supported by the panel 16. The shaft(s) 28 may provide a pivot for the base 18 to flip around in the opening 22. The panel 16 may include an offset 30 with a stop 32 to hold the base 18 in line with the panel 16. The stop 32 may be disposed inside the perimeter of the opening 22 and behind the base 18. The face 20 near the edge 34 of the base 18 may be biased against the stop 32 to maintain the second face 24 in alignment with the surface 14.

Figure 4:
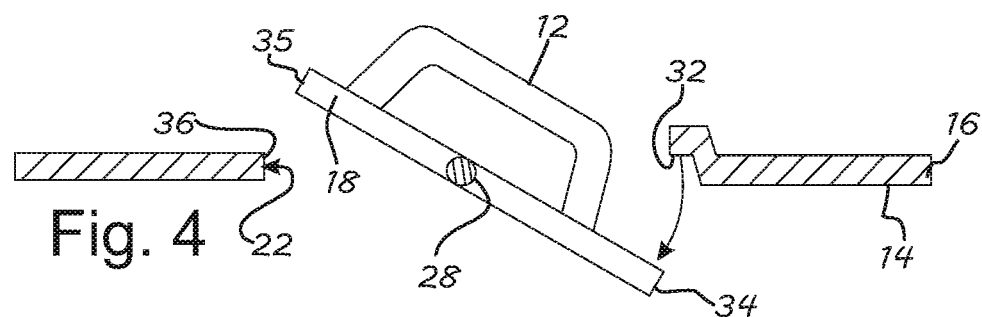
FIG. 4 is a schematic, cross sectional illustration of a product according to a number of variations.
Figure 5:
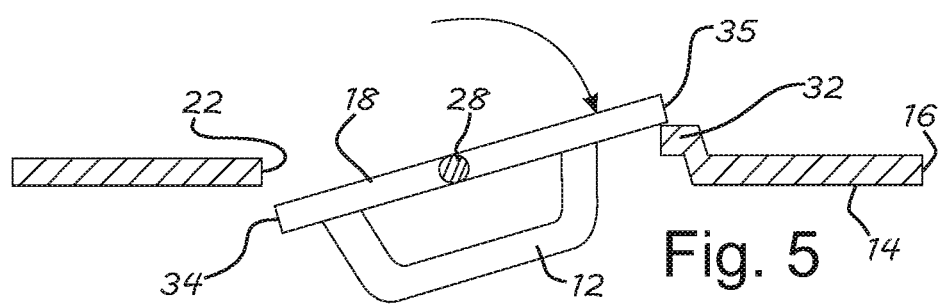
FIG. 5 is a schematic, cross sectional illustration of a product according to a number of variations.
Figure 6:
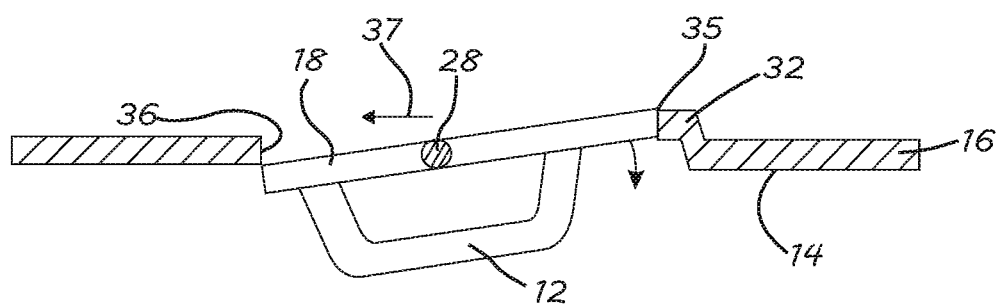
FIG. 6 is a schematic, cross sectional illustration of a product according to a number of variations.
Figure 7:
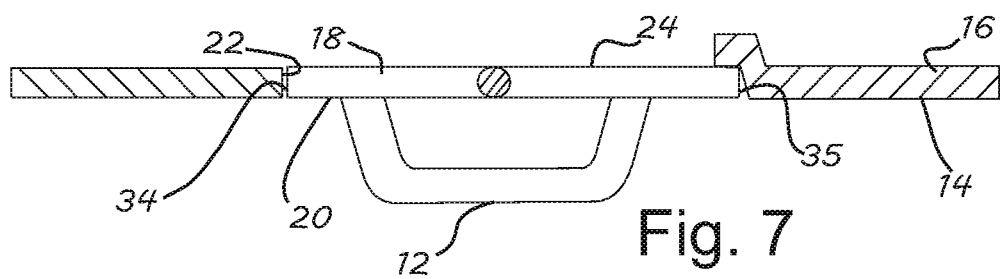
FIG. 7 is a schematic, cross sectional illustration of a product according to a number of variations, taken along the line 7-7 as indicated in FIG. 1.

In a number of variations as illustrated in FIG. 4, the base 18, with the anchor 12, may be rotated against the bias so that the edge 34 is lifted away from the stop 32. As the base 18 is rotated, the edge 34 is moved toward an opposite side 36 of the opening 22 from the stop 32. As the edge 34 approaches the opposite side 36, the stop 32 may interfere with rotation of the base 18. As shown in FIG. 5, the base 18 near the edge 35 may contact the stop 32. Optionally, sufficient clearance may be provided so that no interference occurs, or the stop 32 may be flexible so that the edge 35 may be pushed past the stop 32 as it flexes to complete a one-hundred-eighty degree rotation of the base 18. In a number of variations, the stop 32 may be omitted and the base 18 may be latched to the panel 16, or may have a detent, in either or both of the positions of FIGS. 1 and 2. In a number of variations as shown in FIG. 6, the shaft 28 may be provided with compliance so that the base 18 may be translated toward the opposite side 36 of the opening 22 in the direction 37, and the edge 35 may clear the stop 32. As shown in FIG. 7, this allows the base 18 to complete rotation, at which point the compliance of the shaft 28 may re-center the base 18 in the opening 22. The second face 24 of the base 18 at the edge 35, may be biased against the stop 32 so that the first face 20 of the base 18 may be substantially continuous with the surface 14. The position of FIG. 7 corresponds with the position of FIG. 1 with the anchor loop 12 located on the front side of the panel 16 at the surface 14.

Figure 8:
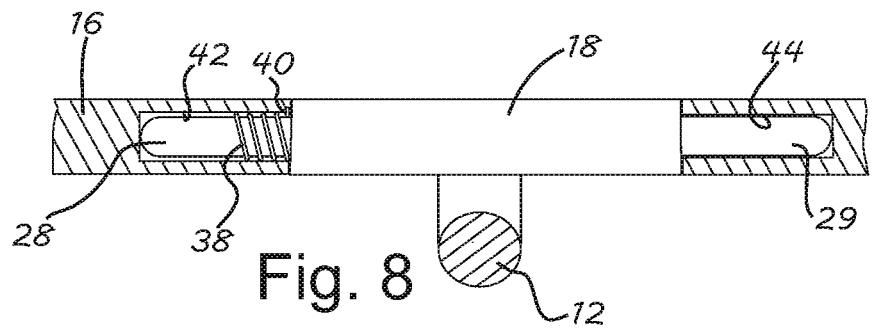
FIG. 8 is a schematic, cross sectional illustration of a product according to a number of variations.
Figure 9:
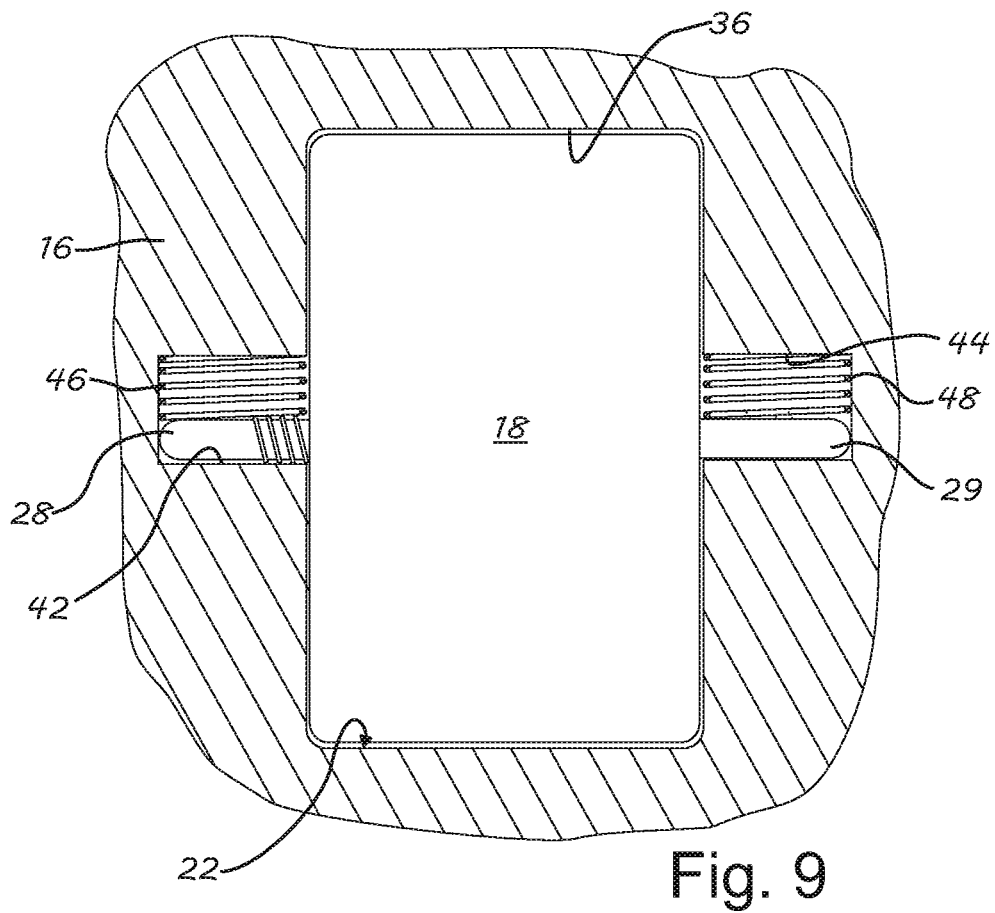
FIG. 9 is a fragmentary, schematic, cross sectional illustration of a product according to a number of variations.

In a number of variations as illustrated in FIG. 8, bias to position the base 18 against the stop 32 may be provided through a spring element 38. The spring element 38 may have an end 40 in a catch in the panel 16, and may be wound around the shaft 28 a sufficient number of times to allow the base 18 to pivot at least one-hundred-eighty degrees. The shaft 28 may be positioned in an opening 42 in the panel 16 sufficiently large to accommodate the shaft 28 and the spring element 38. At the opposite edge of the base 18, another shaft 29 may be positioned in an opening 44 in the panel 16. With reference to FIG. 9, the openings 42, 44 may be elongated to accommodate a pair of spring elements 46, 48, respectively. The spring elements 46, 48 may center the base 18 in the opening 22. The spring elements 46, 48 may provide compliance to allow the shafts 28, 29 to slide in the openings 42, 44, and the base 18 may be translated toward the opposite side 36 of the opening 22 so that the edge 35 can clear the stop 32 during rotation from the position of FIG. 5 to the position of FIG. 6.

Figure 10:
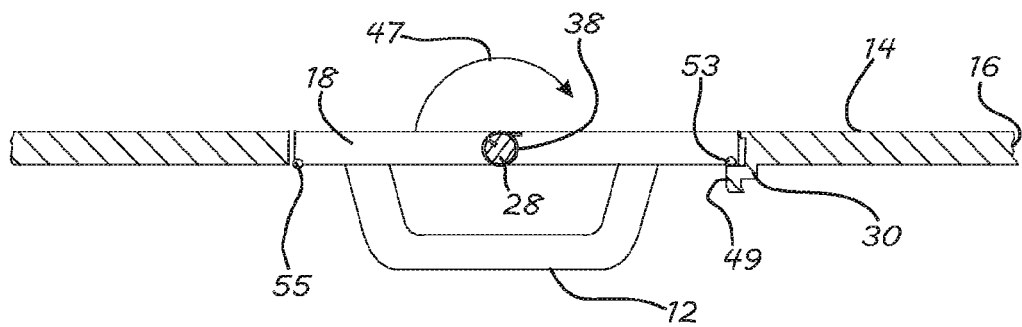
FIG. 10 is a schematic, cross sectional illustration of a product according to a number of variations.
Figure 11:
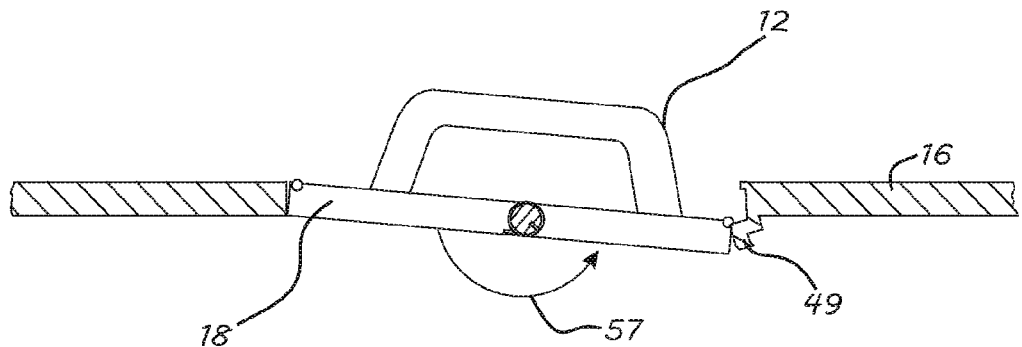
FIG. 11 is a schematic, cross sectional illustration of a product according to a number of variations.
Figure 12:
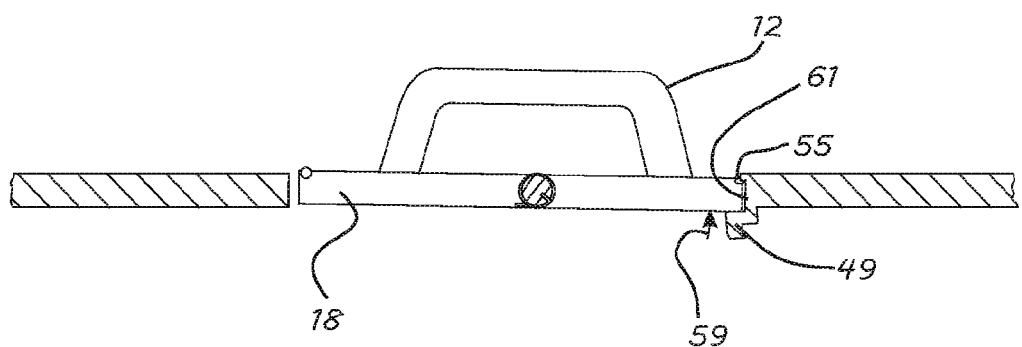
FIG. 12 is a schematic, cross sectional illustration of a product according to a number of variations.

In a number of variations as illustrated in FIGS. 10, 11 and 12, a product may include the base 18 and anchor loop 12 that may be rotatable relative to the panel 16. The spring 38 may be disposed around the shaft 28 and may apply a force 47 to the base 18. The force 47 may load the base 18 to close the opening in the panel 16. A resilient isolator or isolators 53, 55 may be positioned near the edges of the base 18 and may interact with the panel 16 to provide an energy absorber or damping function. In the position of FIG. 10 with the anchor loop 12 in a concealed state behind the panel 16, the isolator 53 may lie against the panel 16 at the offset 30. The offset 30 may include a catch function via retention clip 49. When the base 18 is rotated in the direction 57 as shown in FIG. 11, to reveal the anchor loop 12 in front of the surface 14, the base 18 may contact the retention clip 49, which may flex to allow the base 18 to rotate past. The edge of the base 18 may then enter a receptacle 61 in the panel 16, as shown in FIG. 12, where it may be retained by the retention clip 49. The isolator 55 may contact the panel 16 with the anchor loop in the revealed state of FIG. 12, such as at a lip with the base 18 captured by the retention clip 49. To return the product to an anchor loop 12 concealed state, the base 18 may be forced past the retention clip 49 in a direction opposite to the direction 57.

Figure 13:
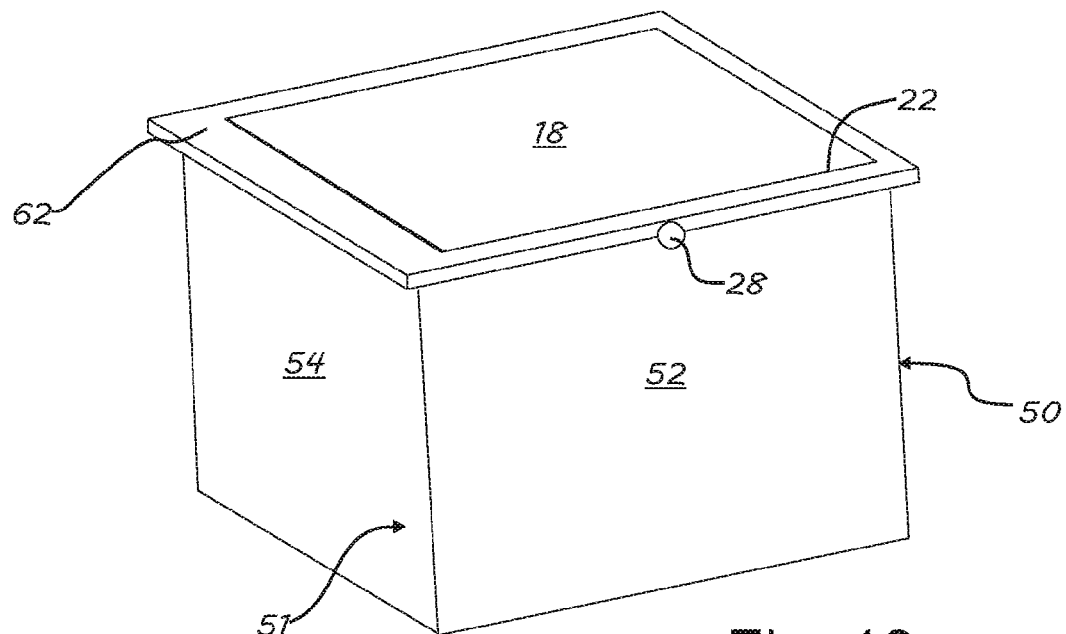
FIG. 13 is a perspective illustration of a part of a product according to a number of variations.
Figure 14:
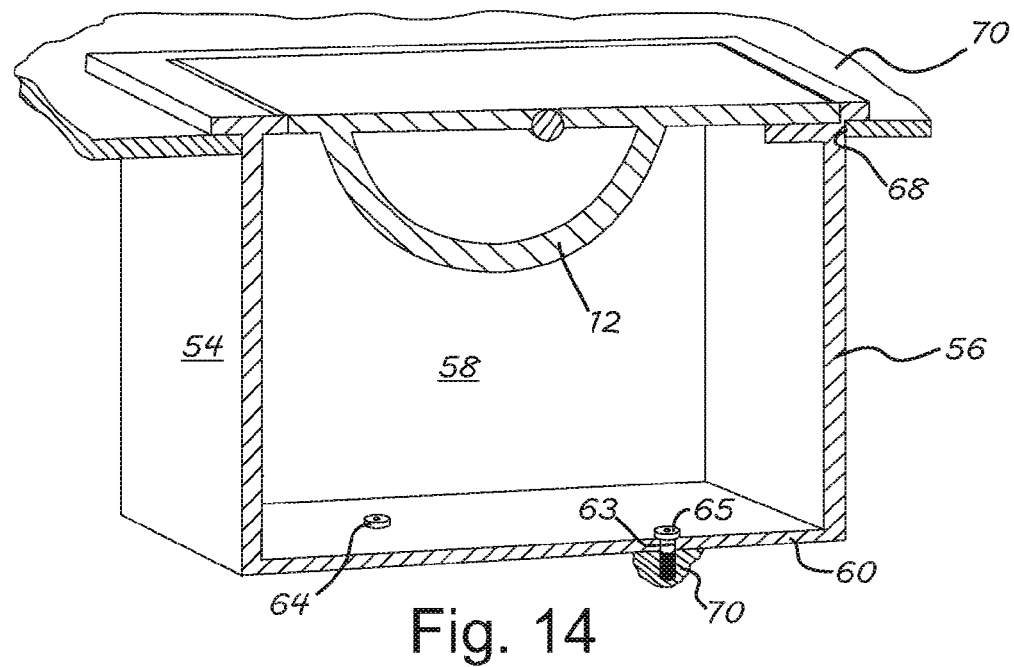
FIG. 14 is a sectioned, perspective illustration of a part of a product according to a number of variations.

In a number of variations as illustrated in FIGS. 13 and 14, the base 18 and anchor loop 12 may be provided in a cartridge assembly 50. The cartridge assembly 50 may provide a convenient way of assembling the product 10 in a panel or other structure. The cartridge assembly 50 may include a case 51 with five walls 52, 54, 56, 58, 60. A sixth wall may be provided as a flange 62 surrounding the opening 22 provided into the case 51. The wall 60, on an opposite side of the case 51 from the opening 22, may be provided with mounting holes 63 for fasteners 64, 65. The cartridge 50 may be received in an opening 68 in the structure 70 on which the anchor loop 12 may be provided, which may be the panel 16. The cartridge 50 may be inserted into the opening 68, the base 18 may be rotated on the shaft(s) 28 to open the case 51, and the fasteners 64, 65 may be applied to the structure 70. The case 51 may provide various functions of the panel 16 as set forth in the description related to FIGS. 1-9.

Through the foregoing variations, an anchor loop 12 may be provided in a desirable location and may be concealed when not needed. The following description of variants is only illustrative of components, elements, acts, product and methods considered to be within the scope of the invention and are not in any way intended to limit such scope by what is specifically disclosed or not expressly set forth.

Variation 1 may involve a product that may include a base that may have a first face and an opposite second face. An anchor may be connected to the first face. A pivot may be provided for the base so that the base may be turned on the pivot. The base may be moveable to a first position where the first face may face in a first direction where the first face may be revealed and the second face may be concealed. The base may be moveable to a second position where the second face may face in the first direction where the first face may be concealed and the second face may be revealed.

Variation 2 may include the product according to variation 1 and may include a panel to which the base may be mounted. When in the second position, the second face may form a continuous surface with the panel.

Variation 3 may include the product according to variation 1 and may include a panel to which the base may be mounted. The panel may define an opening within which the base may be mounted. The panel may include an offset on one side of the opening. A stop may be provided on the offset against which the second face may be biased when the base is in the first position and against which the first face may be biased when the base in in the second position.

Variation 4 may include the product according to variation 3 and may include a spring element that may apply a load to the base to close the opening.

Variation 5 may include the product according to variation 1 wherein the pivot may include a shaft. A spring element may bias the shaft in a second direction that may be perpendicular to the first direction.

Variation 6 may include the product according to variation 5 wherein the spring element may be compressible so that the base is translatable linearly.

Variation 7 may include the product according to variation 1 and may include a case to which the pivot may be connected. The case may have four side walls around an opening in which the base may be mounted.

Variation 8 may include the product according to variation 7 wherein the case may include a flange around the opening.

Variation 9 may include the product according to variation 1 wherein the base may be moveable on the pivot around at least one-hundred-eighty degrees.

Variation 10 may include the product according to variation 1 wherein the anchor may form a loop.

Variation 11 may involve a product that may include a panel defining an opening. The panel may have an outer surface. A base may be reversibly mounted in the opening and may have a first face and a second face. An anchor may be fixed on the base at the first face. The base may be reversibly positioned in a first position where the first face and the anchor may be revealed on a side of the panel at the outer surface and the second face may be concealed on an opposite side of the panel. The base may be reversibly positioned in a second position where the second face may be revealed on the side of the panel at the outer surface and the first face may be concealed on the opposite side of the panel.

Variation 12 may include the product according to variation 11 wherein when in the second position, the second face may form a continuous surface with the outer surface free of projections but with a clearance gap around the base.

Variation 13 may include the product according to variation 11 wherein the panel may include an offset on one side of the opening. A stop may be provided on the offset against which the second face may be biased when the base may be in the first position and against which the first face may be biased when the base may be in the second position.

Variation 14 may include the product according to variation 13 and may include a shaft moveably supporting the base. A spring element may bias the base against the stop in each of the first and second positions. The spring element may be wound around the shaft.

Variation 15 may include the product according to variation 14 and may include a second spring element biasing the shaft in a linear direction.

Variation 16 may include the product according to variation 15 wherein the second spring element may be compressible so that the base may translatable linearly.

Variation 17 may include the product according to variation 11 and may include a case to which the base may be connected forming a cartridge. The case may have four side walls around a second opening in which the base may be mounted.

Variation 18 may include the product according to variation 17 wherein the case may include a flange around the second opening that may abut against the outer surface of the panel.

Variation 19 may include a method of repositioning the product of claim 11 and may include providing a stop to hold the base in each of the first and second positions. The base may be rotated from the first position in one direction until it contacts the stop. The base may be translated linearly until it clears the stop. Rotation of the base may be completed in the one direction until it moves past the stop. The base may be translated linearly until it arrives in the second position against the stop.

Variation 20 may include the method according to variation 19 and may include biasing the base against the stop in each of the first and second positions with a spring element.

What is claimed is:

1. A product comprising a base that has a first face and an opposite second face, an anchor connected to the first face, a pivot on the base, the base turnable on the pivot wherein the base is moveable between a first position where the first face faces in a first direction where the first face is revealed and the second face is concealed, and a second position where the second face faces in the first direction where the first face is concealed and the second face is revealed, and a panel to which the base is mounted, wherein the panel defines an opening within which the base is mounted, the panel including an offset on one side of the opening, with a stop on the offset against which the second face is biased when the base is in the first position and against which the first face is biased when the base is in the second position.

2. The product according to claim 1 wherein when in the second position, the second face forms a continuous surface with the panel.

3. The product according to claim 1 wherein the pivot comprises a shaft, with a spring element disposed around the shaft and biasing the base against the stop.

4. The product according to claim 3 wherein the spring element applies a load to the base to close the opening.

5. The product according to claim 1 wherein the pivot comprises a shaft, and comprising a spring element biasing the shaft in a second direction that is perpendicular to the first direction.

6. The product according to claim 5 wherein the spring element is compressible so that the base is translatable linearly.

7. The product according to claim 1 comprising a case to which the pivot is connected, the case having four side walls around the opening in which the base is mounted.

8. The product according to claim 7 wherein the case includes a flange around the opening.

9. The product according to claim 1 wherein the base is moveable on the pivot around at least one-hundred-eighty degrees.

10. The product according to claim 1 wherein the anchor forms a loop.

11. A product comprising a panel defining an opening, the panel having an outer surface, a base reversibly mounted in the opening and having a first face and a second face, and an anchor fixed on the base at the first face, the base reversible between a first position where the first face and the anchor are revealed on a side of the panel at the outer surface and the second face is concealed on an opposite side of the panel, and a second position where the second face is revealed on the side of the panel at the outer surface and the first face is concealed on the opposite side of the panel, wherein the panel includes an offset on one side of the opening, with a stop on the offset against which the second face is biased when the base is in the first position and against which the first face is biased when the base is in the second position.

12. The product according to claim 11 comprising a shaft moveably supporting the base, and a spring element biasing the base against the stop in each of the first and second positions, the spring element wound around the shaft.

13. The product according to claim 12 comprising a second spring element biasing the shaft in a linear direction.

14. The product according to claim 13 wherein the second spring element is compressible so that the base is translatable linearly.

15. The product according to claim 11 comprising a case to which the base is connected forming a cartridge configured to be received in the opening, the case having four side walls around a second opening in which the base is mounted.

16. The product according to claim 15 wherein the case includes a flange around the second opening that abuts against the outer surface of the panel.

17. A method of repositioning the product of claim 1 comprising: holding the base in each of the first and second positions with the stop; rotating the base from the first position in one direction until it contacts the stop; translating the base linearly until it clears the stop; completing rotation of the base in the one direction until it moves past the stop; and translating the base linearly until it arrives in the second position against the stop.

18. The method according to claim 17 comprising biasing the base against the stop in each of the first and second positions with a spring element.

\* \* \* \* \*